United States Patent Office  3,131,173
Patented Apr. 28, 1964

3,131,173
POLYMERIZATION OF ETHYLENE UTILIZING A CATALYST CONSISTING OF A POLYHALO METHYL COMPOUND
George A. Mortimer, La Marque, Tex., assignor to Monsanto Chemical Company, St. Louis, Mo., a corporation of Delaware
No Drawing. Filed Nov. 21, 1960, Ser. No. 70,452
8 Claims. (Cl. 260—94.9)

This invention relates to a process for the polymerization of ethylene. More particularly, it relates to a novel initiator for the polymerization of ethylene.

It is well known that ethylene can be polymerized at high pressures in the presence of materials which serve as initiators for the reaction. A large number of different classes of compounds have been shown to be initiators for the reaction. These include oxygen, peroxide compounds, and azo compounds.

The polymerization of ethylene with a compound called a telogen, such as carbon tetrachloride, chloroform, trichloroacetic acid, etc., to form a telomer or halogenated hydrocarbon is disclosed in U.S. Patent 2,440,800. This polymerization reaction is carried out at from about 20 to about 1000 atmospheres pressure, from about 60° C. to about 150° C. in temperature, and in the presence of a peroxygen compound as a catalyst. The telogen acts as a modifier or chain transfer agent which limits the reaction so that the polymer formed is a low molecular weight liquid with a halogen contained in the molecule. It has now been discovered that a class of compounds which includes those used heretofore only as modifiers or chain transfer agents can be employed as initiators for the ethylene polymerization reaction.

According to this invention, ethylene is polymerized at elevated temperatures and pressures in the presence of a polyhalomethyl compound with at least one chlorine atom on the methyl carbon represented by the formula

wherein X is a halogen and Y is hydrogen, a halogen, an alkyl radical, an aryl radical, or a substituted alkyl or aryl radical.

Besides initiating the polymerization reaction, these compounds also modify the reaction as is disclosed in the prior art, by very slightly decreasing the molecular weight of the product thus affecting the density to some extent. This effect, of course, is limited by the very small amounts of the polyhalomethyl compounds added.

The following examples are given to illustrate the invention and are not to be construed as limiting it in any manner.

*Example I*

After careful purging of the steel bomb used as the polymerization reactor together with lines connected thereto to eliminate all traces of air or oxygen, the bomb was filled with ethylene at 168° C. and at atmospheric pressure. By means of a hypodermic needle, 0.40 cc. of CHCl₃ was injected into a compartment of the bomb in such a manner as to exclude all air or oxygen. Additional hot ethylene was pumped into the bomb until the pressure reached approximately 7500 p.s.i. while the temperature was maintained at a temperature of 168° C. The mechanical agitator inside the bomb was started and the chloroform (CHCl₃) initiator was forced into the bomb by means of high pressure ethylene. The bomb was then pressured by means of an ethylene pump to the final conditions of 20,000 p.s.i. and 168° C. The CHCl₃ made up 1195 parts per million of the reaction components. After a reaction time of 56 minutes, 1.6 grams of solid ethylene polymer were obtained.

*Example II*

Following the procedure of Example I, ethylene was polymerized in the presence of 242 parts per million of trichlorobromomethane (CCl₃Br) at 25,000 p.s.i. and 179° C. for a period of 29 minutes. At the end of the polymerization, 1.6 grams of ethylene polymer were recovered.

*Example III*

Ethylene was again polymerized in the same reaction bomb using the method of Example I in the presence of 1020 parts per million of 1,1,1-trichloroethane (CH₃CCl₃) and at 20,000 p.s.i. and 186° C. After a reaction time of 40 minutes, the polymer yield was 4.20 grams.

*Example IV*

Using the same procedure as Example I, ethylene was polymerized in the steel bomb using 176 parts per million of difluorotrichloroiodoethane (CF₂ClCCl₂I) as an initiator. The pressure was 10,000 p.s.i. and the temperature was 126° C. After a reaction time of 68 minutes the polymer yield was 0.45 gram.

*Example V*

Following the usual procedure as described in Example I, ethylene was polymerized in the reaction bomb in the presence of 524 parts per million of carbon tetrachloride (CCl₄) as an initiator at 20,000 p.s.i. and 189° C. The polymer yield was 9 grams after a reaction time of 67 minutes.

*Example VI*

Ethylene was again polymerized via the method of Example I with 534 parts per million of α,α,α-trichlorotoluene (C₆H₅CCl₃) employed as an initiator. The pressure was maintained at 20,000 p.s.i., the temperature was 184° C., and the reaction time was 65 minutes. The yield of solid polymer was 0.56 gram.

*Example VII*

Ethylene and 683 parts per million of difluorodibromomethane (CBr₂F₂) as an initiator were reacted at a pressure of 20,000 p.s.i. and a temperature of 177° C. in the steel bomb under the same conditions as described in Example I. After a reaction time of 62 minutes, no detectible amount of polymer had been formed.

It is apparent from the foregoing examples that polyhalomethanes and polyhalomethyl compounds with at least one chlorine atom on the methyl carbon will initiate the high pressure polymerization of ethylene with no other catalyst present.

In addition to the initiators exemplified, other polyhalomethyl compounds suitable as initiators include 1,1,1-trichloropropane; 1,1,1-trichlorobutane; 1,1,1,5-tetrachloropentane; trichloromethyl toluene; trichloromethylbromobenzene, trichloromethylfluorobenzene; α,α,α-trichloro-p-xylene; and α-trichloromethyl naphthalene.

From the results obtained in Example VII it is obvious that all polyhalomethanes are not initiators. It is necessary for the one chlorine atom to be present on the methane or methyl radical for the compound to be an active polymerization initiator. From the formula it can be seen that it is also necessary for the methane or methyl radical to contain at least three halogen atoms in the molecule.

Reaction conditions other than those exemplified can be used without departing from the scope of the invention. Temperatures may vary from 100° C. to 400° C. with those in the range from about 150° to about 300°

C. being preferred. Pressure may likewise vary over a wide range from 5,000 p.s.i. to about 50,000 p.s.i. and above depending upon the particular type of polymer desired.

The amount of polyhalomethyl compound to be used as an initiator depends to some extent on the type of polymer desired which in turn depends upon the particular conditions of temperature and pressure used. Generally, amounts of initiator from about 0.001% to about 5.0% by weight of the ethylene to be polymerized are employed. The polymerization of ethylene using one of these initiators can, of course, be carried out either as a batch, semicontinuous, or continuous operation in either a tubular or autoclave type reactor.

Not only homo-polymers may be prepared using polyhalomethanes or polyhalomethyl compounds as initiators. Ethylene may be copolymerized as well as with other polymerizable compounds using this initiator. Suitable comonomers include, for example, vinyl halides such as vinyl fluoride, vinyl chloride, etc.; vinyl hydrocarbons, both aliphatic and aromatic, such as propylene, isobutylene, and other olefins, butadiene, isoprene, piperylene, dimethylbutadiene, styrene, alpha-alkyl styrenes, ring-substituted alkyl styrenes and the like; the halogen derivatives of hydrocarbons such as chlorostyrenes, fluorostyrenes, chloroprene, bromoprene; vinylidene compounds such as vinylidene chloride, vinylidene fluoride, 1,1-chlorofluoroethylene; vinyl esters including vinyl acetate, vinyl butyrate, vinyl stearate, etc.; vinyl ethers including vinyl methyl ether, vinyl ethyl ether, vinyl octyl ether, and the like; acrylic acid, acrylonitrile, acrylic esters including methyl, ethyl, propyl, etc.; acrylates, acrylamide, alpha-substituted acrylic acids, nitriles, esters, and amides such as methacrylic acid, methacrylonitrile, ethyl methacrylate, methylacrylamide, methyl methacrylate, atroponitrile, etc.; the acids, esters, and amides of $\alpha,\beta$-ethylenically unsaturated dicarboxylic acids such as fumaric, maleic, citraconic, itaconic, etc.; acids or anhydrides, their esters and amides and the like. If a copolymer is prepared by the process of this invention, it should contain more than 50% by weight of ethylene.

What is claimed is:

1. A process for producing normally solid polymers of ethylene which comprises polymerizing ethylene in the absence of any liquid diluent at a temperature from about 100° C. to about 400° C. and at a pressure of from about 5,000 p.s.i. to about 50,000 p.s.i. with a catalyst consisting essentially of a polyhalomethyl compound containing three halogens on the methyl carbon, one of which is chlorine, said compound being present in an amount from about 0.001% to about 5.0% by weight of the ethylene to be polymerized.

2. A process for producing normally solid polymers of ethylene which comprises polymerizing ethylene in the absence of any liquid diluent at a temperature of from about 100° C. to about 400° C. and at a pressure of from about 5000 p.s.i. to about 50,000 p.s.i. with a catalyst consisting essentially of a compound of the formula

where X is a halogen and Y is chosen from the group consisting of hydrogen, the halogens, lower alkyl radicals, aryl radicals, substituted alkyl radicals, and substituted aryl radicals, said compound being present in an amount from about 0.001% to about 5.0% by weight of the ethylene to be polymerized.

3. A process for producing normally solid polymers of ethylene which comprises polymerizing ethylene in the absence of any liquid diluent at a temperature of from about 150° C. to about 300° C. and at a pressure of from about 5000 p.s.i. to about 50,000 p.s.i. with a catalyst consisting essentially of chloroform in an amount from about 0.001% to about 5.0% by weight of said ethylene.

4. A process for producing normally solid polymers of ethylene which comprises polymerizing ethylene in the absence of any liquid diluent at a temperature of from about 150° C. to about 300° C. and at a pressure of from about 5000 p.s.i. to about 50,000 p.s.i. with a catalyst consisting essentially of trichlorobromomethane in an amount from about 0.001% to about 5.0% by weight of said ethylene.

5. A process for producing normally solid polymers of ethylene which comprises polymerizing ethylene in the absence of any liquid diluent at a temperature of from about 150° C. to about 300° C. and at a pressure of from about 5000 p.s.i. to about 50,000 p.s.i. with a catalyst consisting essentially of 1,1,1-trichloroethane in an amount from about 0.001% to about 5.0% by weight of said ethylene.

6. A process for producing normally solid polymers of ethylene which comprises polymerizing ethylene in the absence of any liquid diluent at a temperature of from about 150° C. to about 300° C. and at a pressure of from about 5000 p.s.i. to about 50,000 p.s.i. with a catalyst consisting essentially of difluorotrichloroiodoethane in an amount from about 0.001% to about 5.0% by weight of said ethylene.

7. A process for producing normally solid polymers of ethylene which comprises polymerizing ethylene in the absence of any liquid diluent at a temperature of from about 150° C. to about 300° C. and at a pressure of from about 5000 p.s.i. to about 50,000 p.s.i. with a catalyst consisting essentially of carbon tetrachloride in an amount from about 0.001% to about 5.0% by weight of said ethylene.

8. A process for producing normally solid polymers of ethylene which comprises polymerizing ethylene in the absence of any liquid diluent at a temperature of from about 150° C. to about 300° C. and at a pressure of from about 5000 p.s.i. to about 50,000 p.s.i. with a catalyst consisting essentially of $\alpha,\alpha,\alpha$-trichlorotoluene in an amount from about 0.001% to about 5.0% by weight of said ethylene.

References Cited in the file of this patent

UNITED STATES PATENTS 2,440,800     Hanford et al. _____ May 4, 1948

OTHER REFERENCES

Ellis: "The Chemistry of Synthetic Resins," vol. 1, page 180, Reinhold Publishing Corp., New York (1935).